US009401538B2

(12) United States Patent
Urcia et al.

(10) Patent No.: US 9,401,538 B2
(45) Date of Patent: Jul. 26, 2016

(54) STRUCTURALLY INTEGRATED ANTENNA APERTURE ELECTRONICS ATTACHMENT DESIGN

(71) Applicant: The Boeing Company, Chicago, IL (US)

(72) Inventors: Manny S. Urcia, Bellevue, WA (US); Joseph A. Marshall, Kent, WA (US); Douglas A. McCarville, Orting, WA (US); Otis F. Layton, Bonney Lake, WA (US); Adrian Viisoreanu, Kent, WA (US)

(73) Assignee: The Boeing Company, Chicago, IL (US)

( * ) Notice: Subject to any disclaimer, the term of this patent is extended or adjusted under 35 U.S.C. 154(b) by 138 days.

(21) Appl. No.: 14/154,139

(22) Filed: Jan. 13, 2014

(65) Prior Publication Data

US 2014/0320366 A1 Oct. 30, 2014

Related U.S. Application Data

(62) Division of application No. 12/910,825, filed on Oct. 24, 2010, now Pat. No. 8,661,649.

(51) Int. Cl.

| | |
|---|---|
| ***H01S 4/00*** | (2006.01) |
| ***H01Q 1/12*** | (2006.01) |
| ***H01Q 9/16*** | (2006.01) |
| ***H01Q 1/28*** | (2006.01) |
| ***H01Q 9/28*** | (2006.01) |
| ***H01Q 13/08*** | (2006.01) |
| ***H01Q 21/00*** | (2006.01) |

(52) U.S. Cl.
CPC ............... *H01Q 1/12* (2013.01); *H01Q 1/1207* (2013.01); *H01Q 1/286* (2013.01); *H01Q 9/16* (2013.01); *H01Q 9/28* (2013.01); *H01Q 13/085* (2013.01); *H01Q 21/0087* (2013.01); *Y10T 29/49002* (2015.01); *Y10T 29/49016* (2015.01); *Y10T 29/49018* (2015.01)

(58) Field of Classification Search
CPC .... H04B 1/0346; H04B 1/3888; B01L 1/025; B01L 2200/141; B01L 2300/022; B25J 21/02; H01Q 13/085; H01Q 1/12; H01Q 1/1207; H01Q 1/286; H01Q 21/0087; H01Q 9/16
USPC ........... 29/600–601, 592.1, 509, 523; 411/82, 411/369, 947, 966, 111; 343/700 MS, 873
See application file for complete search history.

(56) References Cited

U.S. PATENT DOCUMENTS

| | | | | |
|---|---|---|---|---|
| 2,304,107 | A | 12/1942 | Leisure | |
| 5,066,180 | A * | 11/1991 | Lang | F16B 37/122 411/103 |
| 7,046,209 | B1 | 5/2006 | McCarville et al. | |
| 7,109,942 | B2 | 9/2006 | McCarville et al. | |
| 7,109,943 | B2 | 9/2006 | McCarville et al. | |
| 7,113,142 | B2 | 9/2006 | McCarville et al. | |
| 7,216,922 | B2 * | 5/2007 | Tuohimaa | B62D 35/00 244/130 |
| 7,230,437 | B2 * | 6/2007 | Eldridge | G01R 31/2889 324/754.07 |
| 7,516,534 | B2 * | 4/2009 | Easterbrook | B21J 15/02 29/509 |
| 7,586,316 | B2 * | 9/2009 | Kuniyoshi | G01R 1/07307 324/756.03 |
| 8,661,649 | B1 * | 3/2014 | Urcia | H01Q 1/12 29/592.1 |
| 8,912,975 | B1 * | 12/2014 | Hafenrichter | H01Q 1/286 343/705 |

* cited by examiner

*Primary Examiner* — Minh Trinh
(74) *Attorney, Agent, or Firm* — McDonnell Boehnen Hulbert and Berghoff LLP

(57) ABSTRACT

An antenna electronics attachment system is disclosed. The antenna electronics attachment system includes a structural honeycomb panel having an array of cells. The antenna electronics attachment system further includes a nutplate coupled to a mounting plate via a plurality of embedded fastening structures. The mounting plate is shaped to fit substantially precisely to a cell of the structural honeycomb panel. The antenna electronics attachment system also includes an electronic component coupled to the nutplate. And, the antenna electronics attachment system further includes mechanical-electronic coupling means operable for change-out while in-service of the electronic component.

6 Claims, 8 Drawing Sheets

STRUCTURALLY INTEGRATED ANTENNA APERTURE ELECTRONICS ATTACHMENT DESIGN

CROSS-REFERENCE TO RELATED APPLICATIONS

The present application is a divisional application of U.S. patent application Ser. No. 12/910,825 entitled "STRUCTURALLY INTEGRATED ANTENNA APERTURE ELECTRONICS ATTACHMENT DESIGN AND METHODOLOGY" filed on Oct. 24, 2010 which is hereby incorporated by reference herein in its entirety.

GOVERNMENT RIGHTS

The invention was made with Government support under Contract Number FA8650-08-D-3857-0011 awarded by the Air Force. The Government has certain rights in this invention.

FIELD

Embodiments of the present disclosure relate generally to antennas. More particularly, embodiments of the present disclosure relate to antenna structures.

BACKGROUND

A challenging operation involved in a build of a Structurally Integrated X-Band Antenna (SIXA) panel is the elevated temperature (350° F.) bond of the dipole feeds to the radio frequency (RF) electronic interconnects. These bonds are meant to be permanent and may be difficult if not impossible to repair during manufacture. In addition, the bonds do not allow change-out of the electronics package in-service, should the need arise. Currently, the dipole feed to RF electronic interconnect operation requires that small core feed legs (typically 0.1 cm×0.1 cm) be passed through precision drilled backskin holes (or vias) and conductive epoxy bonded to transition board feed pads while the board is simultaneously bonded to the backskin with a structural adhesive. The location, flow, and containment of component features and bond adhesives are essential to achieve durable bonds and acceptable electrical continuity. If the quality of either the structural or conductive bonds is poor or the conductive adhesive impinges on adjacent feeds, the antenna may not perform properly.

SUMMARY

A method of manufacture of an antenna electronics attachment is disclosed. A nutplate is coupled to a mounting plate such that a mechanical-electronic interconnect allows in-service change-out. In this manner, durability and repair-ability of the antenna is improved, allowing for future upgrades, reducing manufacturing risk, and providing failsafe operation.

A first embodiment comprises a method for manufacture of an antenna electronics attachment. A nutplate is coupled to a mounting plate via a plurality of embedded fastening structures such that mechanical-electronic coupling means allow in-service change-out of an electronic component coupled to the nutplate.

In a second embodiment, an antenna electronics attachment system comprises a nutplate coupled to a mounting plate via a plurality of embedded fastening structures. The antenna electronics attachment system further comprises mechanical-electronic coupling means operable to allow in-service change-out of an electronic component coupled to the nutplate.

A third embodiment comprises a method for using an antenna electronics attachment. The method provides a nutplate coupled to a mounting plate via a plurality of embedded fastening structures, and provides mechanical-electronic coupling means. The method further performs in-service change-out of an electronic component coupled to the nutplate where the in-service change-out is enabled by the mechanical-electronic coupling means.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to antenna design, manufacturing of the electronic components, and other functional aspects of the systems (and the individual operating components of the systems) may not be described in detail herein. In addition, those skilled in the art will appreciate that embodiments of the present disclosure may be practiced in conjunction with a variety of computational machines, and that the embodiments described herein are merely example embodiments of the disclosure.

Embodiments of the disclosure are described herein in the context of a practical non-limiting application, namely, conformal aircraft antennas. Embodiments of the disclosure, however, are not limited to such aircraft antennas, and the techniques described herein may also be utilized in other electronic components and antenna applications. For example but without limitation, embodiments may be applicable to satellite antennas, communication antennas, radio telescope antennas, direct to home broadcast receiver antennas, mobile device antennas, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
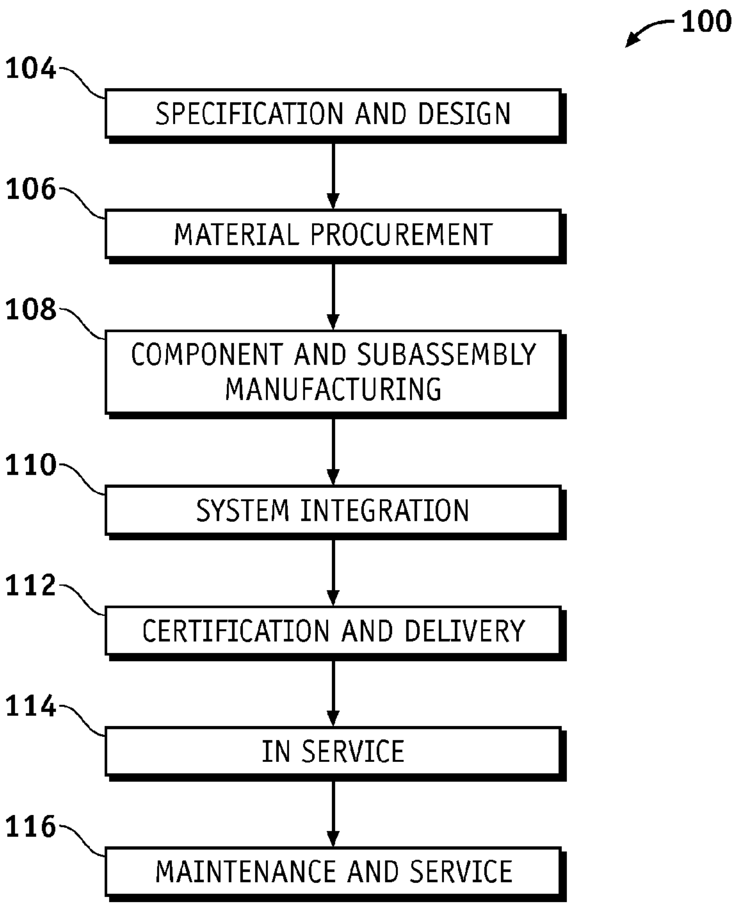
FIG. 1 is an illustration of a flow diagram of an exemplary aircraft production and service methodology.
Figure 2:
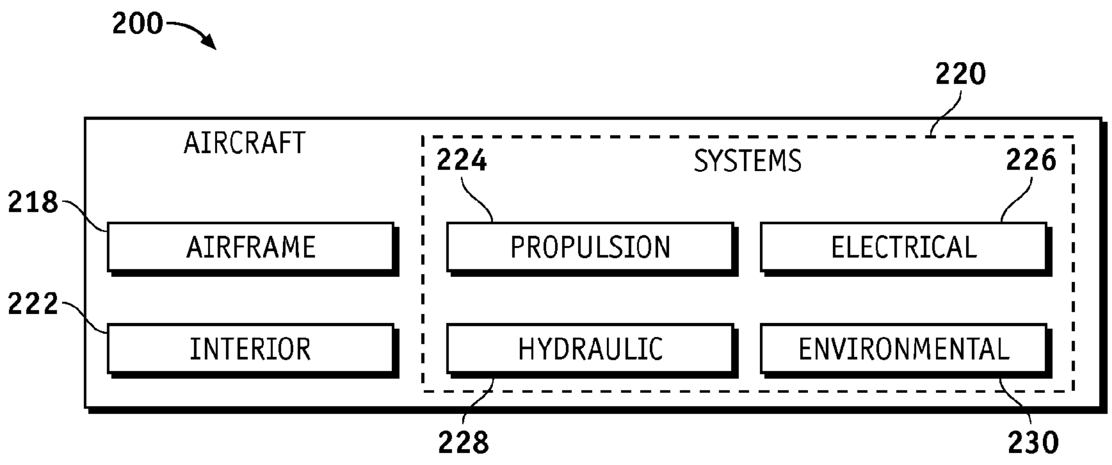
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. Also, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

The embodiments of the disclosure described herein provide a structurally integrated antenna panel RF electronic interconnect system (electronic interconnect system) comprising: a structurally integrated fastener sub-assembly, a tooling block, and a mechanical-electronic interconnect, and manufacturing methods for mechanically fastening electronics packages to structurally integrated antennas. The electronic interconnect system provides a structure that insures structural capability such as shear transfer, fatigue capability, compression fit-up, and layer standoff, electrical performance such as non-interference with antenna beams, and is not located in feedline or functional device stay out zones. Further, the electronic interconnect system provides unique features such as stay-out zones, load transfer, and tolerance fit-up that enable a more robust product. In this manner, the electronic interconnect system provides structurally integrated antennas that can be readily serviced if components operate non-optimally or are deformed during manufacturing or in service. The electronic interconnect system may add minimal weight and cost to implement, which is insignificant compared to a cost of electronics packages that are made more serviceable, and hence more robust by the electronic interconnect system. The manufacturing method integrate seamlessly into existing antenna manufacturing flow, allow mass production (i.e., ganging), and insure precision required to make functional products.

Figure 3:
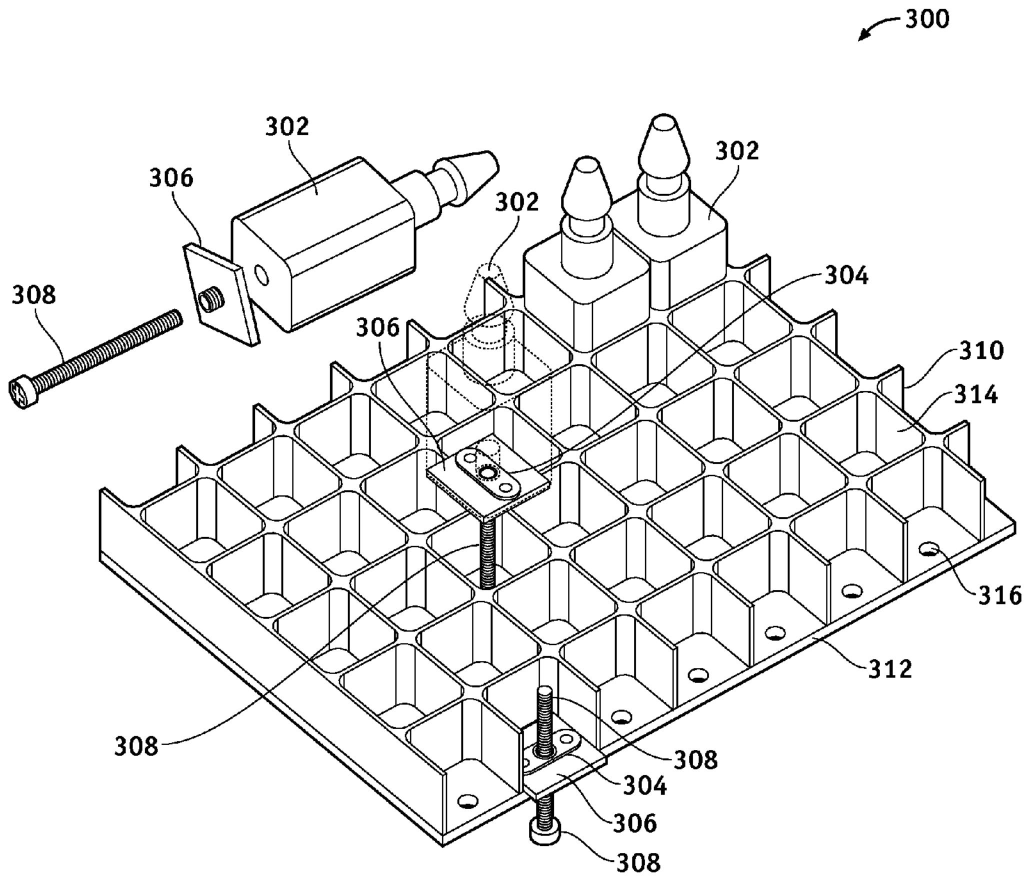
FIG. 3 is an illustration of an exemplary structurally integrated antenna panel RF electronic interconnect system according to an embodiment of the disclosure.

FIG. 3 is an illustration of an exemplary structurally integrated x-band antenna panel RF electronic interconnect system 300 (system 300) according to an embodiment of the disclosure. The system 300 comprises a tooling block 302, a nutplate 304, a mounting plate 306, a stand-off fastener 308, a structural honeycomb panel 310, and a backskin 312.

The nutplate 304 may comprise a stamped sheet metal nut that is riveted to the mounting plate 306 and subsequently bonded to the structural honeycomb panel 310. The nutplate 304 and the mounting plate 306 have close tolerance clearance holes 902 (FIG. 9) for coupling with the stand-off fastener 308 and the mounting rivets 804 (FIG. 8).

Figure 8:
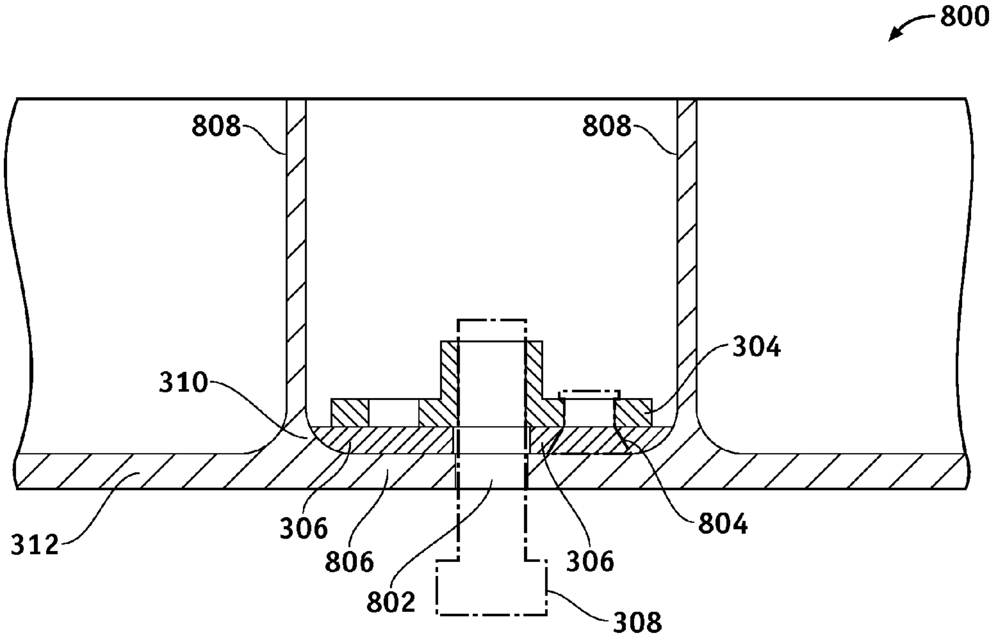
FIG. 8 is an illustration of a cross sectional view of an exemplary mechanical-electronic coupling structure according to an embodiment of the disclosure.

The mounting plate 306 may comprise a composite material bonded to the structural honeycomb panel 310 by an adhesive 806 (FIG. 8). The mounting plate 306 is structurally integrated and is shaped and sized to fit within a cell structure of the structural honeycomb panel 310. The mounting plate 306 transmits bearing and shear loads while locally stiffening an area of the structural honeycomb panel 310 around the mounting plate 306 that may have otherwise been weakened by a stand-off fastener hole 316.

The stand-off fastener 308 is operable to couple an antenna 604 (FIG. 6) and a fastener sub-assembly 402 (FIG. 4) comprising the nutplate 304 and the mounting plate 306. The stand-off fastener 308 in combination with the nutplate 304 and the mounting plate 306 is used to compress a spring loaded pogo pin 712 (FIG. 7) against conductive pads 710 on an electronics package interface layer 702 and mating connections 714 on an electronics package as explained in more detail below. The stand-off fastener 308 can be sized to resist torsional loads.

Figure 6:
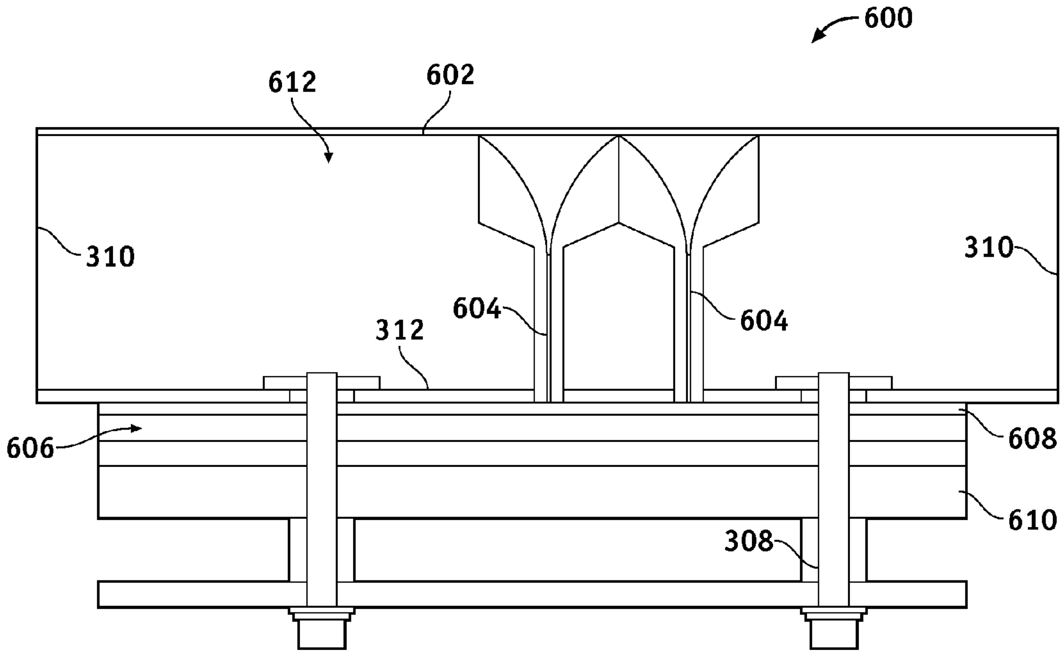
FIG. 6 is an illustration of a portion of an exemplary structurally integrated antenna panel RF electronic interconnect system showing components thereof according to an embodiment of the disclosure.

The structural honeycomb panel 310 may comprise square cell 314 (cell 314) composite structures that have a geometry of a honeycomb. The geometry of honeycomb structures can vary but common feature of such structures are an array of hollow cells separated by thin walls. The hollow cells are often columnar and hexagonal in shape but square shaped in this embodiment so as to properly align the antenna 604 (FIG. 6). A honeycomb shaped structure provides an object with a high stiffness relative to its weight. Honeycomb structures are manufactured by using a variety of different materials, depending on the intended application and required characteristics, used for strength and stiffness for high performance applications. A strength of laminated or sandwich panels depends on a size of the structural honeycomb panel 310, facing material used and a number or density of the honeycomb cells such as cell 314 within the structural honeycomb panel 310.

Figure 4:
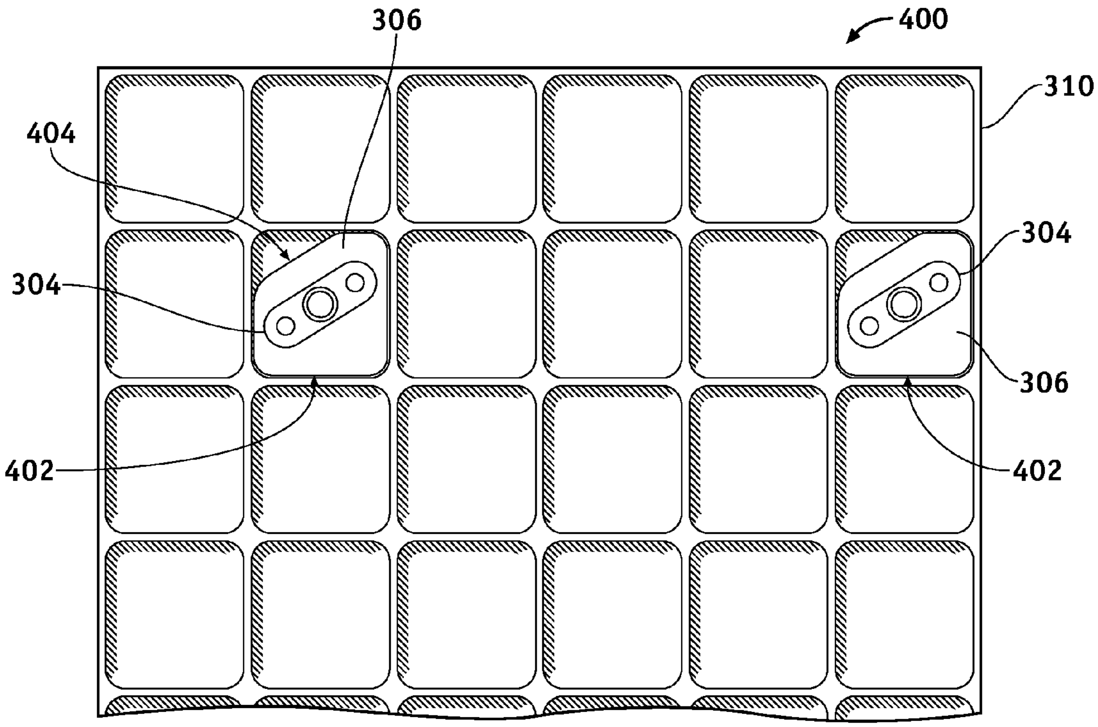
FIG. 4 is an illustration of a top view of a structurally integrated antenna panel RF electronic interconnect system showing an exemplary fastener sub-assembly according to an embodiment of the disclosure.

FIG. 4 is an illustration of top view of an exemplary structurally integrated x-band antenna panel RF electronic interconnect system 400 showing a fastener sub-assembly 402 according to an embodiment of the disclosure. The fastener sub-assembly 402 comprises the nutplate 304, the mounting plate 306, and an orientation notch 404. The orientation notch 404 can be used to insure correct orientation of the fastener sub-assembly 402 during manufacturing and to insure absence of material that might interfere with an electronic feed trace. The nutplate 304 and mounting plate 306 of the fastener sub-assembly 402 are joined to an antenna, such as an antenna 604 in FIG. 6, using, for example but without limitation, a structural film adhesive (i.e., 250F cure Cytec FM300-2) that cures at a temperature low enough not to affect the previously cured antenna sandwich structure, but high enough to provide adequate long term hot wet performance. The mounting plate 306 to backskin 312 bond surfaces is prepped with peel ply and/or mechanical abrasion. In this manner, the tooling blocks 302 used to build the antenna 604 can be modified to locate the fastener sub-assembly 402 and supply pressure during bond.

Figure 5:
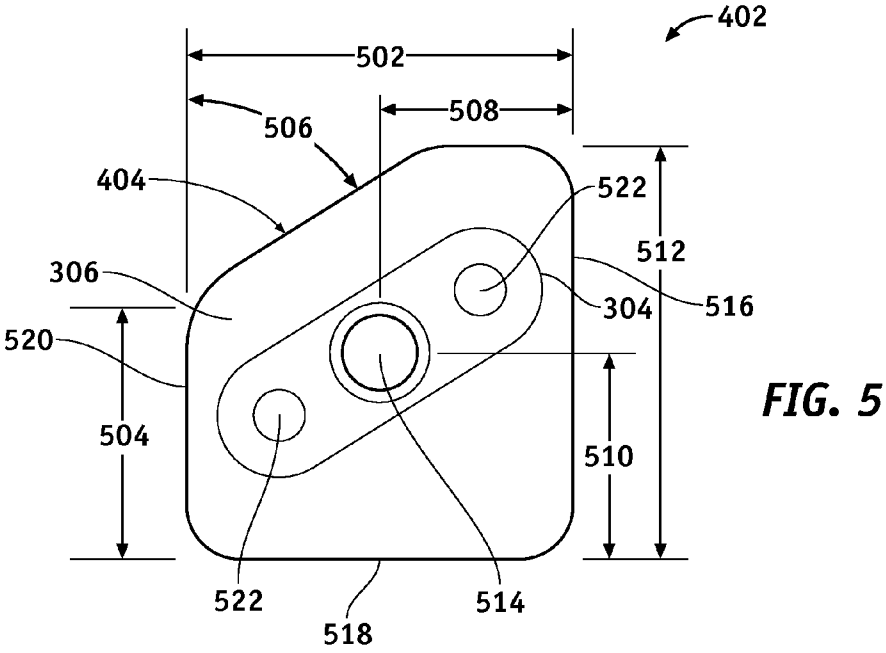
FIG. 5 is an illustration of an enlarged view of the exemplary fastener sub-assembly shown in FIG. 4 according to an embodiment of the disclosure.

FIG. 5 is an illustration of an enlarged view of the fastener sub-assembly 402 of FIG. 4 according to an embodiment of the disclosure. FIG. 5 shows a layout of the fastener sub-assembly 402 as optimized for an about ½"× about ½" square cell 314 of the structural honeycomb panel 310. The fastener sub-assembly 402 comprises the nutplate 304, the mounting plate 306, and the orientation notch 404. Once bonded, the fastener sub-assembly 402 is located in a substantially precise position in the cell 314; hence a specially modified tooling block 302 is used. Additionally, the fastener sub-assembly 402 is shaped to fit substantially precisely against the cell 314 of the structural honeycomb panel 310. In one embodiment, the fastener sub-assembly 402 is bonded to the backskin 312 concurrently with the structural honeycomb panel 310 bonding to the backskin 312. Alternatively, the fastener sub-assembly 402 can be secondarily bonded in place after the antenna 604 is fabricated.

The mounting plate 306 can be shaped to resist torsion forces that may arise during install and removal of the stand-off fasteners 308. The nutplate 304 is coupled to the mounting plate 306 via embedded fastening structures 522. The embedded fastening structures 522 may comprise mounting rivets 804 (FIG. 8). Further, the mounting rivets 804 can function as a failsafe if the bond were to function non-optimally in service or during installation/removal of the stand-off fastener 308.

The fastener subassembly 402 may have, for example but without limitation, width 502 and a right side 516 length 512 of about 0.7-7 cm, a horizontal distance 508 from a center of a fastener hole 514 to a right side 516 of the fastener sub-assembly 402 of about 0.5-5 cm, a vertical distance 510 from the fastener hole 514 to a side 518 of the fastener sub-assembly 402 of about 0.5-5 cm, a left side 520 height 504 of about 0.7-7 cm, and an orientation notch angle 506 of about 5-85 degrees, and the like.

FIG. 6 is an illustration of a portion of an exemplary structurally integrated antenna panel RF electronic interconnect system 600 (system 600) showing components thereof according to an embodiment of the disclosure. The system 600 comprises the stand-off fastener 308, a structurally integrated antenna array 612, a mechanical-electronic interconnect 606, an electronics interface layer 608, and an electronics package 610.

The antenna 604 may comprise a dipole antenna. A dipole antenna is a radio antenna that can be made by a metal feed trace, flared dipole element, and resistors. These antennas are substantially simplest practical antennas. The current amplitude on such an antenna decreases uniformly from a maximum at a center (not shown) of the antenna 604 to zero at ends (not shown) of the antenna 604.

The mechanical-electronic interconnect 606 couples the electronics interface layer 608 and the electronics package 610 as explained in more detail below in the context of discussion FIG. 7.

The electronics interface layer 608 comprises an electrical transformer that can convert electrical signals that are balanced about an electrical ground reference (differential) to signals that are unbalanced (single-ended) and vice versa. The electrical transformer can also be used to connect lines of differing impedance.

The electronics package 610 comprises a central printed circuit board (PCB) and holds many of the components of the system 600, while providing electrical connectors for other peripherals.

The structurally integrated antenna array 612 comprises the radome 602, the antenna 604 (vertical x-band core with integral radiating elements), the structural honeycomb panel 310, and the backskin 312. The structurally integrated antenna array 612 is bonded to the electronics interface layer 608. Small circular pads (conductive pads 710 in FIG. 7) serve as an interface between mating connections 714 (FIG. 7) and the electronics package 610. Instead of bonding the electronics interface layer 608 directly to the electronics package 610, as is done in the existing arts, embodiments of the disclosure use a mechanical-electronic interconnect 704 (FIG. 7) and structurally integrated stand-off fasteners 308 to couple the electronics interface layer 608 to the electronics package 610.

Figure 7:
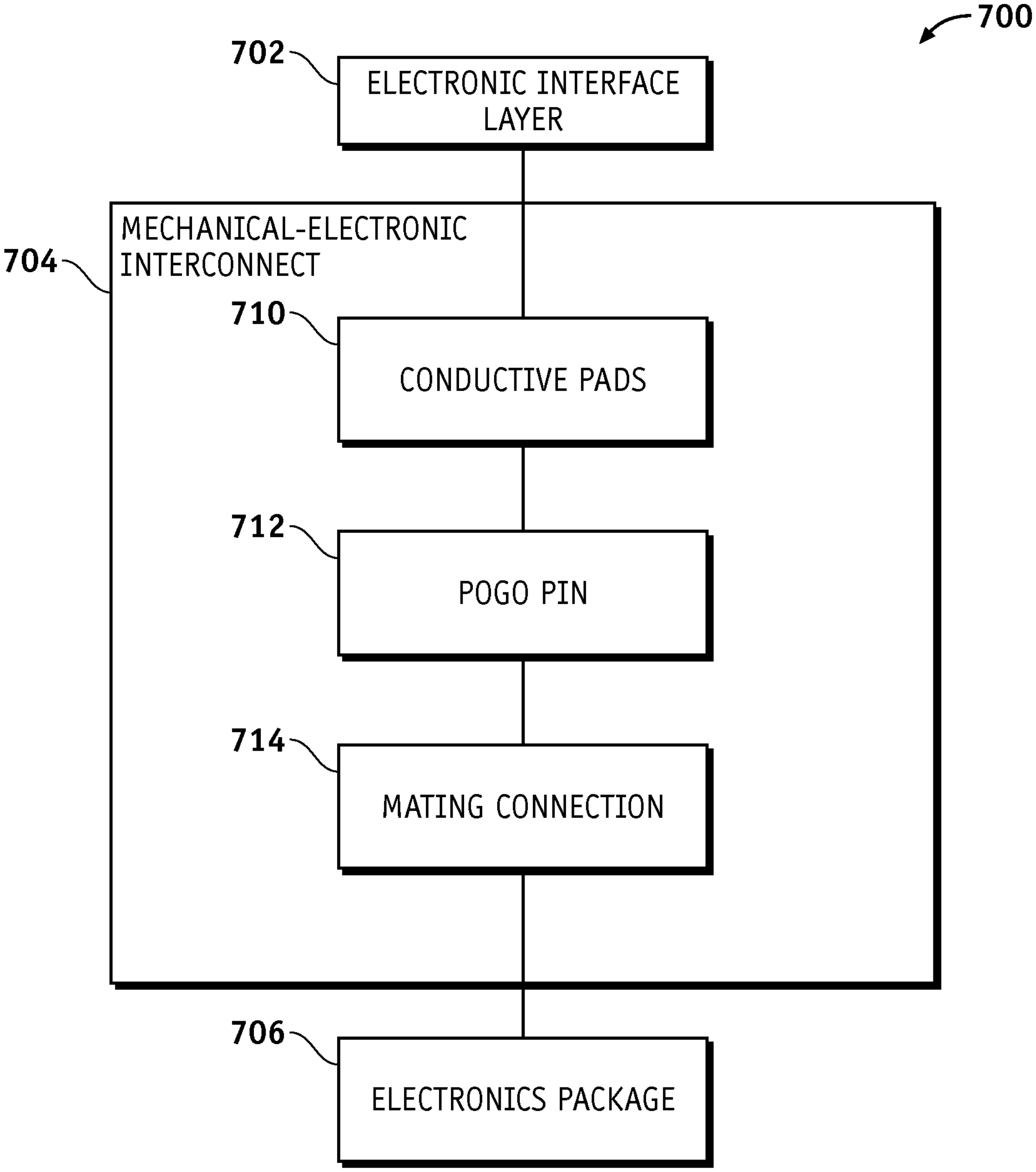
FIG. 7 is an illustration of a block diagram of an exemplary mechanical-electronic interconnect system showing a mechanical-electronic interconnect according to an embodiment of the disclosure.

FIG. 7 is an illustration of an exemplary mechanical-electronic interconnect system 700 (system 700) showing a mechanical-electronic interconnect 704 according to an embodiment of the disclosure. The system 700 comprises an electronics interface layer 702, the mechanical-electronic interconnect 704, and an electronics package 706. The system 700 may have functions, material, and structures that are similar to the embodiments shown in the systems 300, 400, and 600, and the fastener sub-assembly 402. Therefore common features, functions, and elements may not be redundantly described here. The mechanical-electronic interconnect 704 couples the fastener sub-assembly 402 to the electronics package 706 via the electronics interface layer 702. The mechanical-electronic interconnect 704 may comprise conductive pads 710, spring loaded pogo pins 712, and mating connections 714.

The spring loaded pogo pins 712 allow the electronics package 706 to be decoupled from the fastener sub-assembly 402. As mentioned above the stand-off fastener 308 in combination with the nutplate 304 and the mounting plate 306 is used to compress the spring loaded pogo pin 712 against the conductive pads 710 on the electronics package interface layer 608/702 and mating connections 714 on the electronics package 610/706. Spring loaded pogo pins are devices used in electronics to establish a connection between two printed circuit boards. Named by analogy with the pogo stick toy, the pogo pin usually takes the form of a slender cylinder containing two sharp, spring-loaded pins. Pressed between two electronic circuits, the sharp points at each end of the pogo pin make secure contacts with the two circuits and thereby connect them together. The spring loaded pogo pin 712 is one example of electronic coupling means, other electronic coupling means may also be used.

In this manner, an existing art high temperature bond of the antenna 604 to the electronics package 706 is eliminated. Eliminating the existing art high temperature bond in final assembly approach requires a reconsideration of subsystem locations and in-service functionality. Eliminating the existing art high temperature bond is useful because of the vast number of critical/special function devices that make up the electronics package 706. Since the electronics package 706 is mounted to a structural antenna 604 which may be subject to airframe and aerodynamic loads, cyclical loading/heating may reduce an overall performance of individual components of the electronics package 706. By allowing replacement of non-optimal components of the electronics package 706 and/or upgrade to improved components of the electronics package 706, embodiments make an overall structurally integrated antenna panel RF electronic interconnect system 300 more robust.

In an existing bonded antenna assembly, if any components of the electronics package 706 are: (a) defective prior to install, (b) deformed during bond/assembly, or (c) operate non-optimally during the life of the antenna 604; the performance of the antenna 604 may be adversely affected, possibly to the point of functioning non-optimally. In a bonded antenna assembly of the exiting arts, a cost to repair may be extremely high and/or the existing bonded antenna assembly may be substantially impossible to repair. In contrast, the mechanically coupled fastening method described herein provides for in-manufacture and field repair enabled by mechanical-electronic coupling means that are more efficient and cost effective than the bonded antenna assembly of the exiting arts.

FIG. 8 is an illustration of a cross sectional view of an exemplary mechanical-electronic coupling structure 800 (structure 800) according to an embodiment of the disclosure. The structure 800 comprises the structural honeycomb panel 310, the nutplate 304, the mounting plate 306, the stand-off fastener 308, a fastener hole 802, a mounting rivet 804, and an adhesive 806. The structure 800 may have functions, material, and structures that are similar to the embodiments shown in FIGS. 1-7. Therefore common features, functions, and elements may not be redundantly described here. The fastening process comprises coupling the nutplate 304 to the mounting plate 306 via flush countersunk rivets such as the mounting rivet 804 and/or bonding adhesive 806. Therefore, the nutplate 304 can be fixed rigidly or allowed to float as fit-up dictates. The mounting plate 306 is made from the same composite as the structural honeycomb panel 310 and/or the backskin 312 in order to; (a) minimize disruption of an antenna array beam, (b) facilitate bonding, and (c) provide improved local stiffening/bearing capability that will offset in-plane property reductions caused by the fastener hole 802.

The fastener hole 802 comprises a space for the stand-off fastener 308, to pass through the nutplate 304.

The mounting rivet 804 (embedded fastening structures) comprises a mechanical fastener. Before being installed, the mounting rivet 804 comprises a smooth cylindrical shaft with a head on one end. An end opposite the head is called the buck-tail. On installation the mounting rivet 804 is placed in a punched or pre-drilled hole, and the buck-tail is upset, or bucked (i.e. deformed), so that the buck-tail expands to about 1.5 times an original diameter of the cylindrical shaft, holding the mounting rivet 804 in place. To distinguish between the two ends of the mounting rivet 804, the original head is called a factory head and the deformed end is called the shop head or buck-tail. Because there is effectively a head on each end of an installed mounting rivet 804, the mounting rivet 804 can support tension loads (loads parallel to an axis of the cylindrical shaft); however, it is much more capable of supporting shear loads (loads perpendicular to the axis of the cylindrical shaft).

The adhesive 806 bonds the mounting plate 306 to the structural honeycomb panel 310 and the backskin 312. The adhesive 806 comprises an adhesive, or glue, which is a mixture in a liquid or semi-liquid state that adheres or bonds items together. Adhesives may come from either natural or synthetic sources. Types of materials that can be bonded are numerous, but they are especially useful for bonding thin materials. Adhesives cure (harden) by either evaporating a solvent or by chemical reactions that occur between two or more constituents. Adhesives are advantageous for joining thin or dissimilar materials, minimizing weight, and when a vibration dampening joint is needed. A disadvantage to adhesives is that they do not form an instantaneous joint, unlike most other joining processes, because the adhesive needs time to cure.

Figure 9:
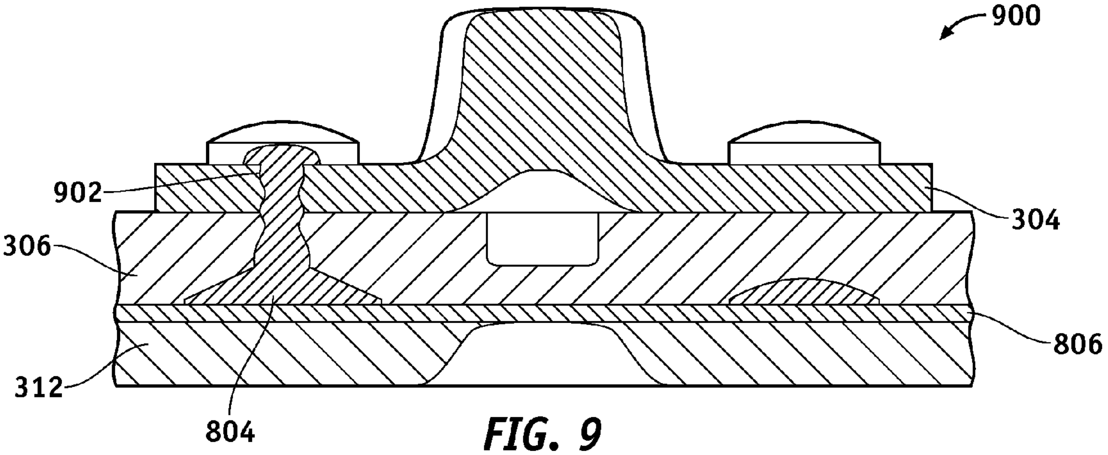
FIG. 9 is an illustration of a cross sectional view of an exemplary mechanical-electronic coupling structure showing embedded fastening structures according to an embodiment of the disclosure.

FIG. 9 is an illustration of a cross sectional view of an exemplary mechanical-electronic coupling structure 900 showing mounting rivet 804 according to an embodiment of the disclosure. The mechanical-electronic coupling structure 900 comprises the nutplate 304, the mounting plate 306, the structural honeycomb panel 310, the mounting rivet 804 installed through clearance hole 902, and the adhesive 806.

When using a failsafe rivet such as the mounting rivet 804 the thickness of the mounting plate 306 should be sufficient to avoid a knife-edge condition when countersinking the clearance hole 902. If the nutplate 304 is merely bonded to the mounting plate 306, the mounting plate 306 can be thinner as dictated by structural loads. The fastener sub-assembly 402 which comprises the nutplate 304 and the mounting plate 306 may be made as a gang and routed or machined to a final desired shape.

Figure 10:
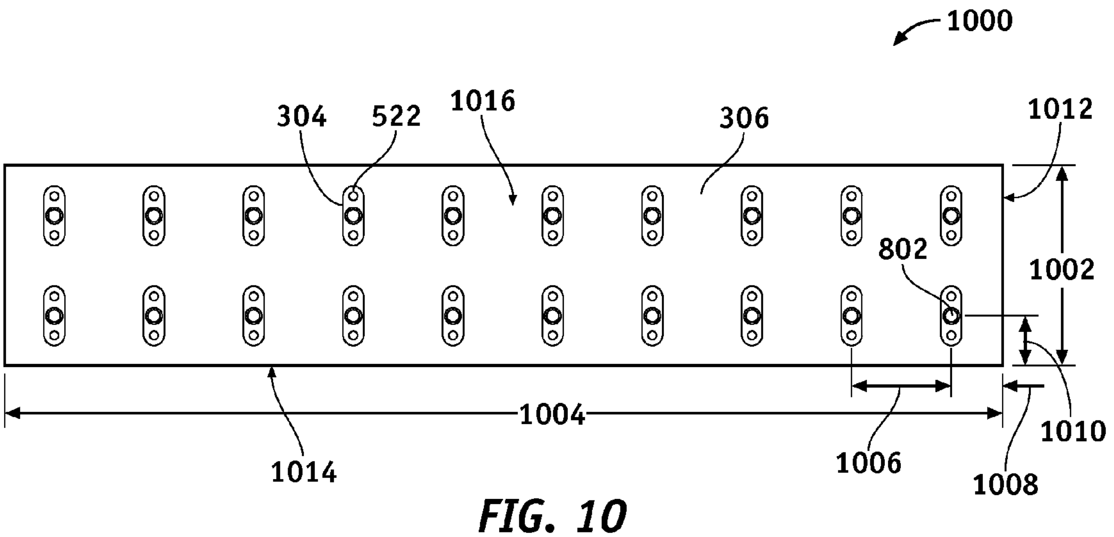
FIG. 10 is an illustration of an exemplary manufacturing array for fastener sub-assemblies according to an embodiment of the disclosure.

FIG. 10 is an illustration of an exemplary manufacturing array 1000 for the fastener sub-assembly 402 according to an embodiment of the disclosure. The manufacturing array 1000 may have functions, material, and structures that are similar to the embodiments shown in FIGS. 3-9. Therefore common features, functions, and elements may not be redundantly described here.

The manufacturing array 1000 comprises nutplates 304 coupled to a mounting plate substrate 1016 via the embedded fastening structures 522/mounting rivets 804. The mounting plate substrate 1016 may comprise, for example but without limitation, a width 1004 of about 0.1-10 cm and a length 1002 of 1-100 cm, and the like. A spacing 1006 between the nutplates 304 of the fastener sub-assembly 402 may be, for example but without limitation, about 2-10 cm, and the like. A distance 1008 from a center of the fastener hole 802 of the nutplate 304 of the fastener sub-assembly 402 to an edge 1012 of the manufacturing array 1000 may be, for example but without limitation, about 0.2-2 cm, and the like. A distance 1010 from the center of the fastener hole 802 to the edge 1014 of the manufacturing array 1000 may be, for example but without limitation, about 0.2-2 cm, and the like.

Figure 11:
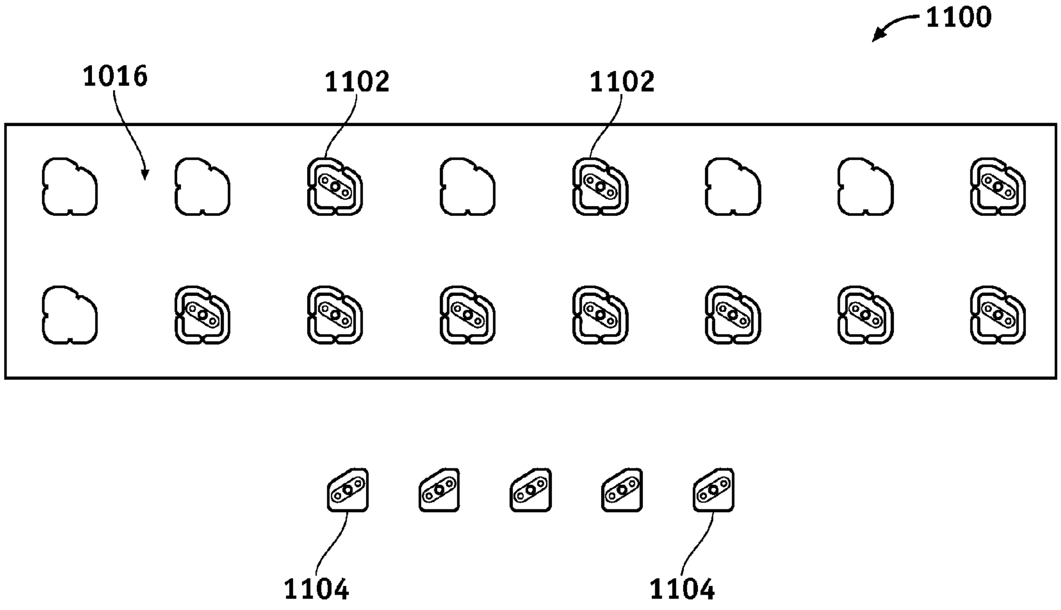
FIG. 11 is an illustration of an exemplary manufacturing array for integrating fastener sub-assemblies according to an embodiment of the disclosure.

FIG. 11 is an illustration of an exemplary manufacturing array 1100 for integrating electronics attachment modules 1104 (fastener sub-assembly 402 in FIG. 5) according to an embodiment of the disclosure. The manufacturing array 1100 may have functions, material, and structures that are similar to the embodiments shown in FIGS. 3-10. Therefore common features, functions, and elements may not be redundantly described here. The manufacturing array 1100 comprises a plurality of antenna electronics attachments 1102 embedded in the mounting plate substrate 1016. The antenna electronics attachments 1102 are separated from the mounting plate substrate 1016 to form individual antenna electronics attachment modules 1104 comprising the mounting plate 306.

Since the electronics package 706 is mounted to a structural antenna 604 of the manufacturing array 1100 which may be subject to airframe and aerodynamic loads, cyclical loading/heating may reduce an overall performance of individual components of the electronics package 706. Having the ability provided by the mechanical-electronic coupling means described herein to replace non-optimal components of the electronics package 706 and/or upgrade to improve components of the electronics package 706 makes the overall structurally integrated antenna panel RF electronic interconnect system 300 more robust.

Figure 12:
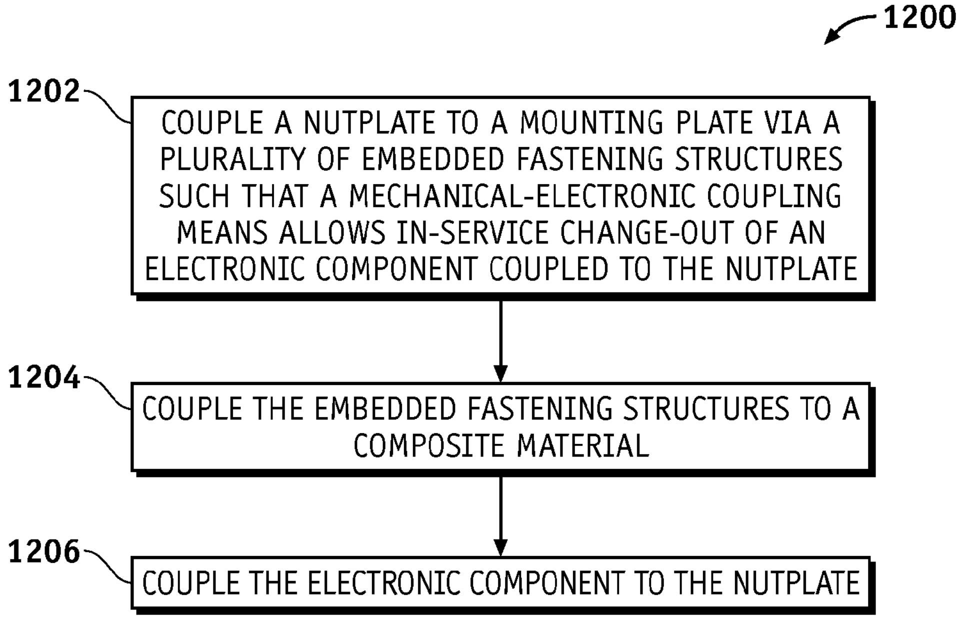
FIG. 12 is an illustration of an exemplary flowchart showing a process for manufacturing an antenna electronics attachment according to an embodiment of the disclosure.

FIG. 12 is an illustration of an exemplary flow chart showing a process 1200 for manufacturing an antenna electronic attachment according to an embodiment of the disclosure. The various tasks performed in connection with process 1200 may be performed mechanically, by software, hardware, firmware, or any combination thereof. It should be appreciated that process 1200 may include any number of additional or alternative tasks, the tasks shown in FIG. 12 need not be performed in the illustrated order, and process 1200 may be incorporated into a more comprehensive procedure or process having additional functionality not described in detail herein. For illustrative purposes, the following description of process 1200 may refer to elements mentioned above in connection with FIGS. 1-11. In practical embodiments, portions of the process 1200 may be performed by different elements of the systems 300-700 and structures 800-900 such as: the embedded fastening structure/mounting rivet 804, the antenna 604, the nutplate 304, the mounting plate 306, the stand-off fastener 308, the fastening sub-assembly 402, the radome 602, the structural honeycomb panel 310, the electronics interface layer 702, the mechanical-electronic interconnect 606/704, and the electronics package 610/706. Process 1200 may have functions, material, and structures that are similar to the embodiments shown in FIGS. 1-11. Therefore common features, functions, and elements may not be redundantly described here.

Process 1200 may begin by coupling the nutplate 304 to a mounting plate 306 via a plurality of fastening structures (e.g., mounting rivet 804), such that a mechanical-electronic coupling means (e.g., mechanical-electronic interconnect 704) allows in-service change-out of an electronic component coupled to the nutplate 304 (task 1202). The electronic component may comprise, for example but without limitation, the dipole antenna 604, the electronics package 706 coupled to the dipole antenna 604 via the nutplate 304, and the like.

Process 1200 may continue by coupling the embedded fastening structures to a composite material (task 1204) such as the backskin 312.

Process 1200 may continue by coupling the electronic component such as the dipole antenna 604 to the nutplate 304 (task 1206).

Figure 13:
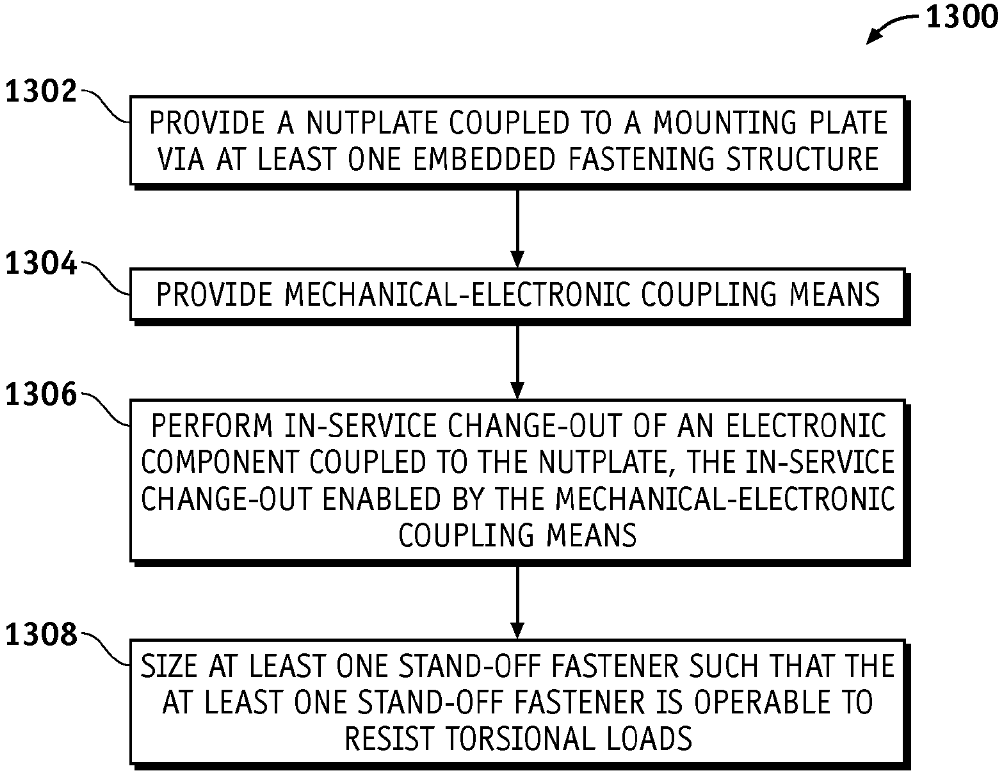
FIG. 13 is an illustration of an exemplary flowchart showing a process for using an antenna electronics attachment according to an embodiment of the disclosure.

FIG. 13 is an illustration of an exemplary flow chart showing a process 1300 for using an antenna electronic attachment according to an embodiment of the disclosure. The various tasks performed in connection with process 1300 may be performed mechanically, by software, hardware, firmware, or any combination thereof. It should be appreciated that process 1300 may include any number of additional or alternative tasks, the tasks shown in FIG. 13 need not be performed in the illustrated order, and process 1300 may be incorporated into a more comprehensive procedure or process having additional functionality not described in detail herein. For illustrative purposes, the following description of process 1300 may refer to elements mentioned above in connection with FIGS. 1-11. In practical embodiments, portions of the process 1300 may be performed by different elements of the system 300-700 and structures 800-900 such as: the embedded fastening structure/mounting rivet 804, the antenna 604, the nutplate 304, the mounting plate 306, the stand-off fastener 308, the embedded fastening sub-assembly 402, the radome 602, the structural honeycomb panel 310, the electronics interface layer 608/702, the mechanical-electronic interconnect 606/704, and the electronics package 610/706. Process 1300 may have functions, material, and structures that are similar to the embodiments shown in FIGS. 1-11. Therefore common features, functions, and elements may not be redundantly described here.

Process 1300 may begin by providing the nutplate 304 coupled to the mounting plate 306 via at least one embedded fastening structure (task 1302) such as the mounting rivet 804.

Process 1300 may continue by providing mechanical-electronic coupling means (task 1304) such as the mechanical-electronic interconnect 704.

Process 1300 may continue by performing in-service change-out of an electronic component coupled to the nutplate 304, the in-service change-out is enabled by the mechanical-electronic coupling means (task 1306). The mechanical-electronic coupling means may use at least one stand-off fastener 308 to couple the electronics interface layer 608/702 to the electronics package 610/706. As mentioned above, instead of bonding the electronics interface layer 608 directly to the electronics package 610 (i.e., as is done in the existing arts) embodiments of the disclosure use a the mechanical-electronic coupling means and structurally integrated stand-off fasteners 308 to couple the electronics interface layer 608/702 to the electronics package 610/706.

Process 1300 may continue by sizing the at least one stand-off fastener 308 such that the at least one stand-off fastener 308 is operable to resist torsional loads (task 1308).

In this way, embodiments of disclosure provide the following: (a) a structurally integrated mounting plate 306 that is shaped and sized to fit within the structural honeycomb panel 310 and transmit bearing and shear loads while locally stiffening an area that would have otherwise been weakened by the fastener hole 802; (b) the nutplate 304 coupled to the stand-off fastener 308 that is sized to resist torsional loads, fits within the structural honeycomb panel 310 and integrates with the structural honeycomb panel 310, (c) at least one flush mount rivet such as the mounting rivet 804 that serves as assembly aid and provides failsafe operation, (d) a bonding method and adhesive 806 that does not deform the antenna 604 and provides long term substantially extreme environment capability, (e) an electronics package such as the electronics package 610/706 that are packaged with replacement in mind, and (f) the mechanical-electronic interconnect 606/704 that eliminates a hard to manufacture and difficult to repair antenna to electronics bonded interface.

In this manner, embodiments of the disclosure improve a durability and repair-ability of an antenna such as the antenna 604, allow for future upgrades, improve manufacturing yield, and provide failsafe provisions.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 4 and FIG. 6 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An antenna electronics attachment system comprising:
- a structural honeycomb panel having an array of cells;
- a nutplate coupled to a mounting plate by a plurality of embedded fastening structures, wherein the mounting plate is shaped to fit substantially precisely to one of a cell of the array of cells of the structural honeycomb panel;
- an electronic component coupled to the nutplate; and
- mechanical-electronic coupling means operable for change-out while in-service of the electronic component.

2. The antenna electronics attachment system of claim 1, wherein the electronic component comprises a dipole antenna.

3. The antenna electronics attachment system of claim 1, further comprising the electronic component coupled to the nutplate.

4. The antenna electronics attachment system of claim 1, wherein the mechanical-electronic coupling means comprises a pogo pin.

5. The antenna electronics attachment system of claim 1, wherein the embedded fastening structures comprise at least one mounting rivet.

6. The antenna electronics attachment system of claim 5, wherein the at least one mounting rivet functions as a failsafe.

* * * * *